US008112535B2

(12) United States Patent
Fishman et al.

(10) Patent No.: US 8,112,535 B2
(45) Date of Patent: Feb. 7, 2012

(54) SECURING A SERVER IN A DYNAMIC ADDRESSING ENVIRONMENT

(75) Inventors: Neil S Fishman, Redmond, WA (US); Arnold N Blinn, Hunts Point, WA (US)

(73) Assignee: Microsoft Corporation, Redmond, WA (US)

(*) Notice: Subject to any disclaimer, the term of this patent is extended or adjusted under 35 U.S.C. 154(b) by 525 days.

(21) Appl. No.: 11/947,809

(22) Filed: Nov. 30, 2007

(65) Prior Publication Data

US 2009/0144437 A1    Jun. 4, 2009

(51) Int. Cl.
    *G06F 15/16*    (2006.01)
(52) U.S. Cl. .......... 709/229; 709/224; 709/230; 726/10; 726/11; 726/14
(58) Field of Classification Search .................. 709/228, 709/229, 230; 726/10, 11, 14
    See application file for complete search history.

(56) References Cited

U.S. PATENT DOCUMENTS

| 6,223,291 | B1 | 4/2001 | Puhl et al. |
| 6,249,873 | B1 | 6/2001 | Richard et al. |
| 6,564,216 | B2 | 5/2003 | Waters |
| 6,785,812 | B1 | 8/2004 | Botham et al. |
| 6,823,454 | B1 | 11/2004 | Hind et al. |
| 7,228,359 | B1 | 6/2007 | Monteiro |
| 2005/0081028 | A1 | 4/2005 | Thornton et al. |
| 2005/0114670 | A1 | 5/2005 | Bowe et al. |
| 2006/0158336 | A1 | 7/2006 | Nourbakhsh et al. |
| 2006/0265508 | A1* | 11/2006 | Angel et al. .................. 709/230 |
| 2007/0022469 | A1 | 1/2007 | Cooper et al. |
| 2007/0047585 | A1* | 3/2007 | Gillespie et al. ............. 370/475 |
| 2007/0261112 | A1* | 11/2007 | Todd et al. ....................... 726/11 |

OTHER PUBLICATIONS

"Guide to securing Intranet and Extranet servers", Getronics PinkRoccade, 2005, pp. 22.
"IPControl Software", BT INS Inc., 2007, pp. 2.
"EntireX Security for Broker Services", Software AG, 1997-2007, pp. 1-4.
Fitzek, et al., "Authentication and Security in IP based Multi-Hop Networks", 7th WWRF Meeting in Eindhoven, Dec. 2002, pp. 1-5.
Braden, R., Requirements for Internet Hosts—Application and Support, RFC 1123, Request for Comments, Oct. 1989.

* cited by examiner

*Primary Examiner* — Yves Dalencourt
(74) *Attorney, Agent, or Firm* — Russell S. Krajec; Krajec Patent Offices, LLC

(57) ABSTRACT

A dynamic address router may provide dynamically updated routing to a device with a dynamic network address as well as provide a security certificate for the device. The device may be routed using a subordinate domain name. The principal domain name and a security certificate may be held by a single service provider that may enable a simple setup and configuration mechanism, as well as to guarantee the authenticity of the security holder even though the holder may connect through a dynamic address connection.

17 Claims, 3 Drawing Sheets

SECURING A SERVER IN A DYNAMIC ADDRESSING ENVIRONMENT

BACKGROUND

Many network service providers use a dynamic addressing mechanism to periodically change a network address assigned to a connection. Examples include cable television broadband connections and digital subscriber line (DSL) connections. In each case, a user's address may be changed periodically, such as weekly, daily, or in some cases every few hours.

In situations where a user is using a connection primarily as an outgoing connection, such as surfing the Internet or retrieving and sending email, a user may not realize that the network address of their connection may be periodically changed. However, when a user attempts to access a system that is behind a dynamic address connection, the user may use a network address successfully one day, but not be able to use the same address the next day. Further, because a consistent address or domain name may not exist, various security devices, such as Secure Socket Layer certificates, cannot be assigned to the user.

SUMMARY

A dynamic address router may provide dynamically updated routing to a device with a dynamic network address as well as provide a security certificate for the device. The device may be routed using a subordinate domain name. The principal domain name and a security certificate may be held by a single service provider that may enable a simple setup and configuration mechanism, as well as to guarantee the authenticity of the security holder even though the holder may connect through a dynamic address connection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
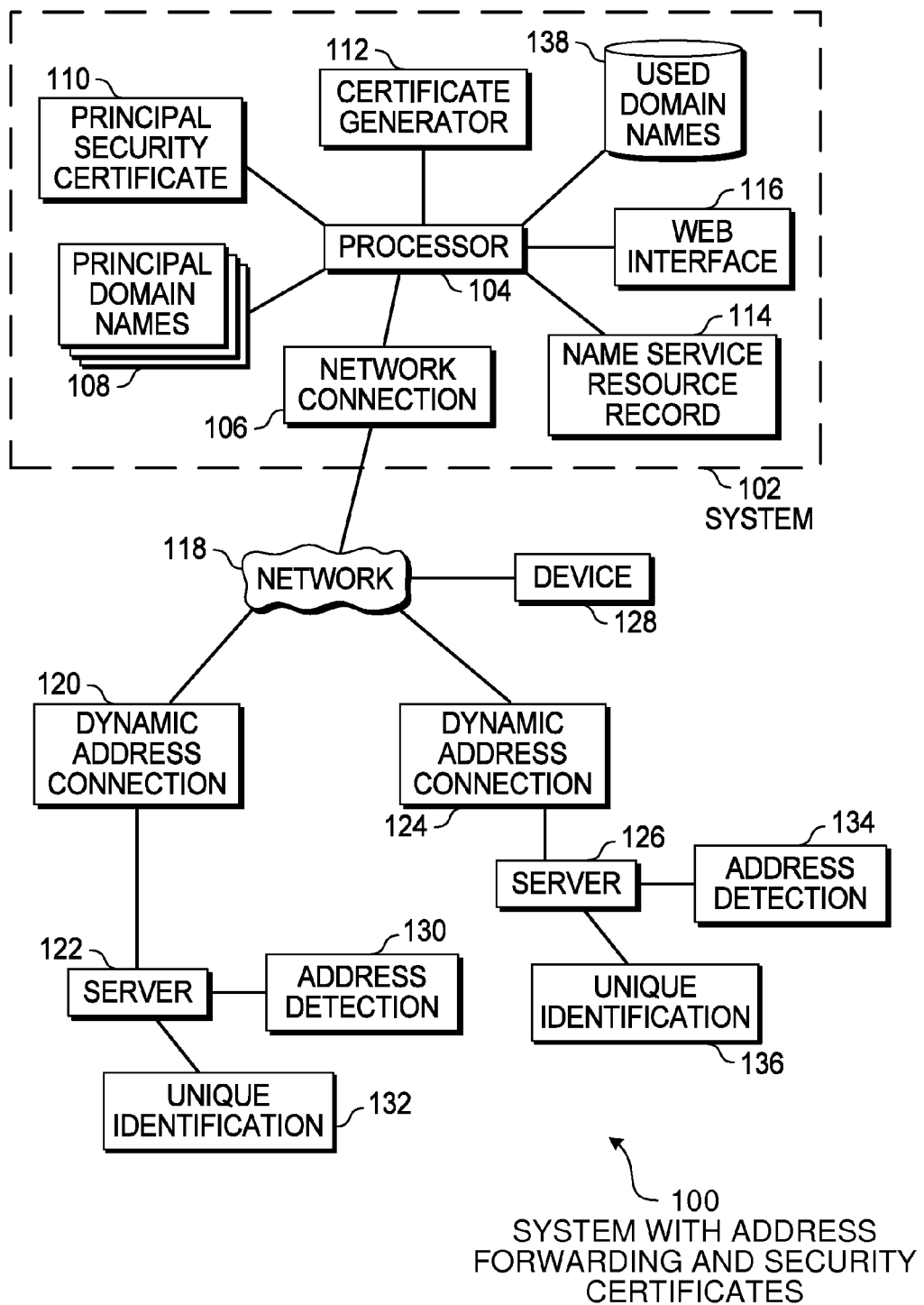
FIG. 1 is a diagram illustration of an embodiment showing a system with address forwarding and security certificates.

Domain names and security certificates may be provided to servers that have a network connection with a dynamic address. By coupling dynamic domain name services with security certificate issuance, a security certificate issuer may have the assurance that the certificate is being used by an authenticated device.

Many servers, such as small business servers or home servers connect to the Internet using cable modems, DSL connections, and other connections that have network addresses that are periodically changed. Because the address may change, these servers may not be able to obtain both domain names and security certificates through conventional sources that may enable a user to access the business server or home server from the Internet.

A server with a dynamic address connection may connect to a primary server that may control one or more subordinate domain names. A server administrator may request a tertiary or other subordinate domain name. The primary server may add the tertiary or subordinate domain name to a name service on the primary server so that requests for the subordinate name may return the server's network address.

The server's network address may be updated by a routine or application operating on the server that detects when the network address for the server has changed. When a new address is determined, the new address may be transferred to the primary server and the routing records updated. The server may also include a unique identifier with any updating sequence so that the server is authenticated at each update.

The primary server may create a security certificate that may be used by various applications such as web browsers to establish and/or verify a secure connection. The security certificate may be subordinate to or created under the provisions of a principal security certificate. A principal security certificate may be any security certificate that is obtained by the primary server and may be used to grant subordinate security certificates under the authority of one or more of the principal security certificates. The principal security certificate may be any type of security certificate used in any type of security mechanism.

The combination of dynamic addressing service, subordinate domain name registration, and security certificate generation enables a small business or home server to provide secure access from remote locations. The server may be accessible using the Internet Protocol (IP) address, but the IP address may be difficult to remember and is subject to change periodically. The dynamic addressing service may enable a user to access the server by using a conventional name, such as homeserver.example.com.

The combination of dynamic addressing and security certificate generation enables a security certificate to be issued to a dynamically addressed device because the same entity may provide both the dynamic addressing and certificate services. In general, security certificates are used to authenticate a server so that a user may be assured that the server is the actual server it claims to be. Some embodiments may include an authentication mechanism in the form of a unique identifier or other authentication method that may be used to assure a certificate provider that the issued security certificate is legitimately used.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with address forwarding and security functions. Embodiment 100 is an example of a system that may provide tertiary or subordinate domain names as well as security certificates to various servers that may have a dynamic network address.

The diagram of FIG. 1 illustrates functional components of a system and may not correspond directly with a hardware or software component of a system. In some cases, a component may be a hardware component, a software component, or a combination of hardware and software. Hardware components may include general purpose components adaptable to perform many different tasks or specially designed components that may be optimized to perform a very specific function. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the various functions described.

The system 102 may provide domain names and security certificates to servers 122 and 126, each of which has a dynamic address connection 120 and 124, respectively. The system 102 may have a processor 104 that receives various communications through a network connection 106.

The system 102 may have one or more domain names 108. In many cases, the principal domain names 108 may be a secondary domain name such as example.com. The servers 120 and 124 may be assigned tertiary or subordinate domain names such as businessname.example.com or joeshomeserver.example.com. In many cases, a server to which a domain name is assigned may be able to delegate control of a subordinate domain to another server.

A mechanism for assigning a subordinate domain name to another server may be to store the address and subordinate domain name in a name service resource record 114. A name service may be referred to as a Domain Name Service (DNS) or some other designation. The resource record within the name service may serve as a lookup table or definition of the subordinate domain. Other embodiments may have different mechanisms for registering an address for servers 122 and 126.

In some network communication protocols, a device 128 may begin a communication session with the server 122 by using a domain name as an address for the server 122. For example, the domain name assigned to the server 122 is businessname.example.com. When a lookup is performed, a DNS server may return an IP address for the system 102 to which businessname.example.com may be assigned. When a request for the address of or a connection to businessname.example.com is received by system 102, the system 102 may return the IP address for the server 122 from the name service resource record 114. Other network communication protocols may have different mechanisms for establishing a connection or transmitting messages from the device 128 to the server 122.

Because the servers 122 and 126 are connected to the Internet 118 and thus the system 102 through dynamic address connections 120 and 124, respectively, the addresses of the servers 122 and 126 may change periodically. Dynamic address connections 120 and 124 may be used in various cable television networks, digital subscriber line (DSL) networks, and other connections to a network. In many cases, such connections may have more bandwidth for downstream traffic, i.e., to the server 122, than upstream traffic, i.e., from the server 122. Dynamic address connections may have been implemented to thwart a high bandwidth web server on such a network without paying an extra fee for a static or unchanging address.

Each server 122 and 126 may have an address detection mechanism 130 and 134, respectively. The address detection mechanism may periodically check the status of the dynamic address connection, determine if the address has changed, and forward a new address to the system 102 so that the name service resource record 144 may be updated.

In some embodiments, the servers 122 and 126 may have a unique identification 132 and 136 that may be used during an address update sequence. The unique identification may include unique hardware, software, or combination of hardware and software identifiers that may be used to authenticate the servers 122 and 126 to the system 102. Such identifiers may include hardware identifiers such as a Media Access Control (MAC) address, an embedded serial number in a processor, dongle, or other hardware item. Some identifiers may include a software security certificate, a downloaded encryption key, a login name and password, or some other device.

The unique identifiers 132 and 136 may provide an authentication mechanism during the address update sequence. Such a mechanism may ensure that a malicious device may not intercept messages intended for the server 122 by performing an address update sequence while acting as if it were the server 122. When an update is performed by server 122 or 126, the server may transmit the unique identification 132 and 136 as an authentication mechanism.

The system 102 may have a certificate generator 112 that may be used to generate a security certificate based on a principal security certificate 110. A security certificate may be a software component that is issued to a device based on some verification of the ownership of the device. The security certificate may verify or authenticate a first device to a second device.

Many different types of security certificates may be used. In some cases, a certificate issuer may perform various levels of verification of the owner of a domain is authentic. For example, a certificate may be issued after a certificate authority makes phone, mail, or email contact with a domain owner. The certificate authority as a third party to a communication may be contacted to verify that the certificate is valid.

A security certificate is an expression of the level of trust in a server that has the certificate. Some security certificates may be very highly trusted and may be established after an extensive background check. Other security certificates may be issued with a lower level of trust where a less extensive amount of background verification may be done.

In many cases, a security certificate holder may be able to issue other security certificates that are at the same level or lower than the security certificate the holder may have. The certificate generator 112 may create a specific level of security certificate for the servers 122 and 126 based on the primary security certificate 110. The security certificates issued to servers 122 and 126 may be based in part on the trust relationship that has to do with the dynamic addressing for the domain name as well as the unique identification 132 and 136 that may be used to authenticate devices 122 and 126.

In general, a secure communication session with a certificate holder may be performed as follows. A communication session may begin with a handshake when a client connects to a certificated server requesting a secure connection, and presents a list of ciphers and hash functions. From this list, the server may pick the strongest cipher and hash function that it also supports and notifies the client of the decision. The server may then send back its identification in the form of a digital certificate. The certificate may contain the server name, the trusted certificate authority, and the server's public encryption key. The client may contact the server of the trusted CA and confirm that the certificate is authentic before proceeding. In order to generate the session keys used for the secure connection, the client may encrypt a random number with the server's public key, and send the result to the server. The server can decrypt the random number with a private key that corresponds with the public key. The secured connection may begin with the random number being used to encrypt data being sent from the server to the client, and the public key being used to encrypt data being sent from the client to the server.

Many different types of applications may use a secure communication session. In some cases, email programs, web browsers, virtual private networks, or other applications may be able to establish and operate secure communication sessions.

The system may establish a meaningful, trusted certificate for a server with a dynamically assigned address. After an initial configuration and the establishment of unique identification mechanisms for the servers, each update of the network address for the server may verify authenticity using the unique identification. Such a mechanism may enable high levels of trust to be established for the security certificates even with a dynamic address connection.

The system 102 may have various architectures. In a smaller embodiment, the system 102 may be a single server device that operates the various components. In other embodiments, several servers may be used to perform various functions. For example, one server may handle the name service functions, another may handle the web interface 116, and a third may perform security certificate and domain name functions. Some embodiments may use a cluster or group of servers for one or more of the functions described.

The web interface 116 may be used by an administrator of server 122 or 126 to perform all or a portion of the setup and administrative actions for establishing a subordinate domain name and security certificate. In cases where the trust level of the server's security certificate is low, an administrator may be able to authenticate using a credit card, a user identification to a web hosted application such as email, or other personal identification. For a higher level trust certificate, the administrator may provide a copy of a driver's license, passport, or other personal identification. In some cases, a certificate verification service may contact an internet service provider, a network connection provider, or another third party to verify the credentials of a system administrator.

The web interface 116 may enable an administrator of server 122 or 126 to configure a server for external, secure access in a single session. Within the session, the administrator may select a domain name, have a security certificate created, and download and install any updates to the server 122 or 126 to operate with the certificate and with the selected domain name. Such a service may be more convenient than creating a domain name with a register, sign up for domain forwarding with a second service, and obtain a security certificate from a third source.

In many embodiments, a system 102 may have several domain names 108 from which a user may create their own subordinate domain name. For example, a system 102 may have example.com, example.org, example.net, as well as big.example.com or other variations. A user may be able to create joes.big.example.com or some other domain name, which may be verified against the used domain name database 138 to ensure that the domain name is not already assigned. In some embodiments, a user may be able to browse a list of assigned names, have a domain name automatically generated, or use some other mechanism to determine a domain name for a server.

Security certificates may be issued for a limited period of time. The system 102 or server 122 may periodically request and updated security certificate prior to or when a security certificate expires. In some cases, an administrator may present additional authentication credentials to be issued a new security certificate. In other embodiments, an updated security certificate may be automatically issued on or near a current security certificate's expiration date.

In many cases, the system 102 may issue a security certificate in accordance with a usage policy. The usage policy may, for example, restrict the amount of traffic or the type of content being accessed using the certificate. An example may be to restrict a certificate holder from using the certificate in conjunction with a commercial enterprise or for the distribution of pornography or other content.

The system 102 may have a mechanism ro monitoring the content or usage parameters and restricting, revoking, or otherwise invalidating the security certificate for noncompliance.

Figure 2:
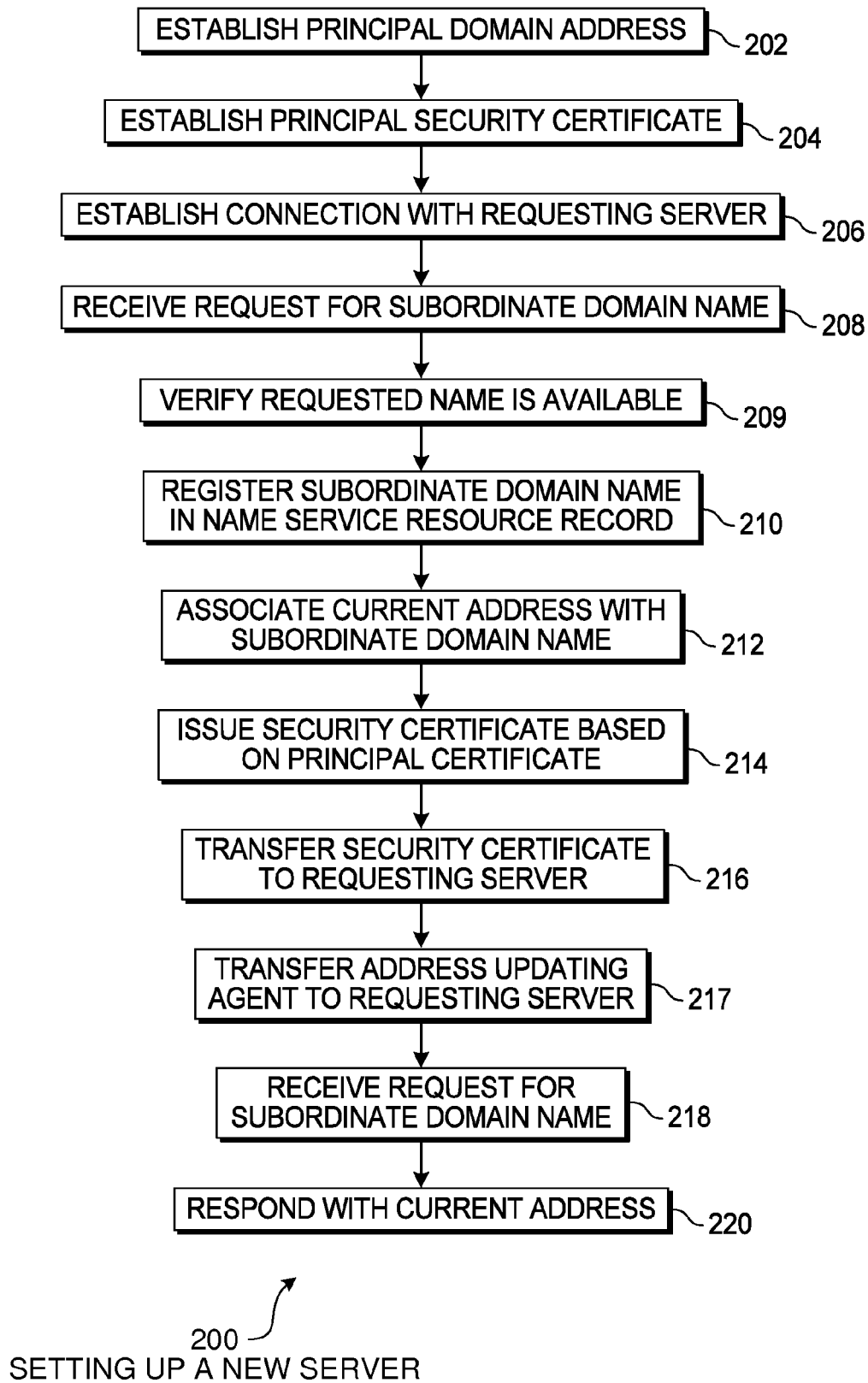
FIG. 2 is a flowchart illustration of an embodiment showing a method of setting up a new server.

FIG. 2 is a flowchart illustration of an embodiment 200 showing a method for setting up a server. Embodiment 200 is an example of one method by which a device may be registered with a subordinate domain name and have a security certificate issued. Embodiment 200 illustrates the actions of a primary server as it may interact with a subordinate server. Other embodiments may use different steps, nomenclature, or sequences to perform the functions described in embodiment 200. In some cases, additional steps or functions may be provided, while in other cases some steps or functions may be removed.

The primary server may establish a principal domain address in block 202 and principal security certificate in block 204. In many embodiments, a primary server may have various principal domain addresses from which a user may select. In some cases, the primary server may have a secondary domain name, such as example.com. In some cases, the primary server may have a tertiary domain name, such as server.example.com. The primary server may be able to assign subordinate domain names to a server, such as joeshome.server.example.com, where 'joeshome' may be a domain name selected by a user.

A connection may be established with the requesting server in block 206. In some embodiments, a server may establish a connection using a web browser or some other application. Such a connection may be established in conjunction with or after an installation routine for server software in some cases.

A requested domain name may be received in block 208 and verified in block 209. Different embodiments may have different mechanisms to determine a verified domain name in blocks 208 and 209. In some embodiments, a user may suggest a name in block 208 and the name may be checked to ensure that the name is not currently assigned in block 209. In some cases, a user may be given a selection of automatically generated domain names based on their user identification or some other data. In some other cases, a user may browse names that have been assigned and create a name that is not on a list.

The verification in block 209 may include checking a proposed name against a list of assigned names or against a set of rules that may have prohibited words, phrases, or other objectionable content.

After the domain name is verified in block 209, the subordinate domain name may be registered in a name server resource record in block 210. The current address of the requesting server may be associated with the subordinate domain name in block 212. Such a change may enable a name service to forward requests for a subdomain to the requesting server.

A security certificate may be issued in block 214 based on the authority of a principal certificate. In some embodiments, various levels of security certificates may be issued. In some cases, a low level security certificate may be issued based on a user's credit card, a user identification for an email service, or some other mechanism. In other cases, a higher level security certificate may be granted where additional proof of identify may be given, including driver's license, passport, certificate of incorporation for a company, bank statement, or other proof. In some cases, a telephone, email, or mail verification may be performed.

The security certificate may be transferred and installed to the requesting server in block 216. An address updating agent may be transferred and installed in block 217. The address updating agent may operate on the requesting server to determine when the address changes and to send the updated address to the primary server.

When a request for the subordinate domain name is received in block 218, the current address may be returned in block 220. The operation of blocks 218 and 220 may be performed with a name service such as a DNS service.

Figure 3:
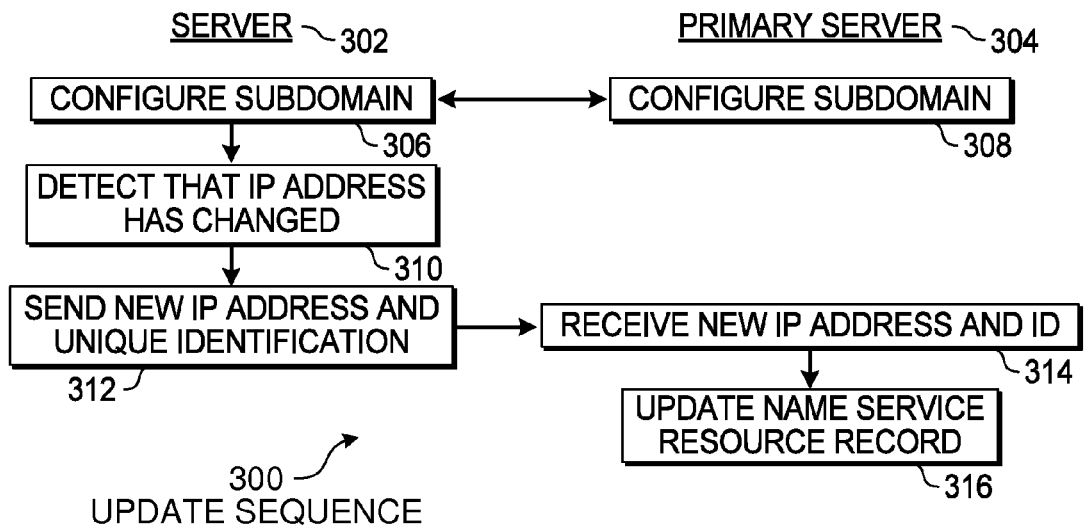
FIG. 3 is a timeline illustration of an embodiment showing an update sequence.

FIG. 3 is a timeline illustration of an embodiment 300 showing a sequence for updating an IP address. The actions of a server 302 are shown on the left and a primary server 304 on the right. The primary server 304 may be a device that provides domain name forwarding services and may accept updated IP addresses for the server 302. In a typical embodiment, the server 302 may have a dynamically addressed network connection.

In blocks 306 and 308, the server 302 and primary server 304 may configure a subdomain. In some embodiments, a process similar to that illustrated in FIG. 2 may be performed.

The server 302 may detect that the IP address for the server 302 has changed in block 310. The server 302 may send the new IP address and a unique identification in block 312 to primary server 304 that receives the same in block 314.

The primary server 304 may update the name service resource record in block 316.

Figure 4:
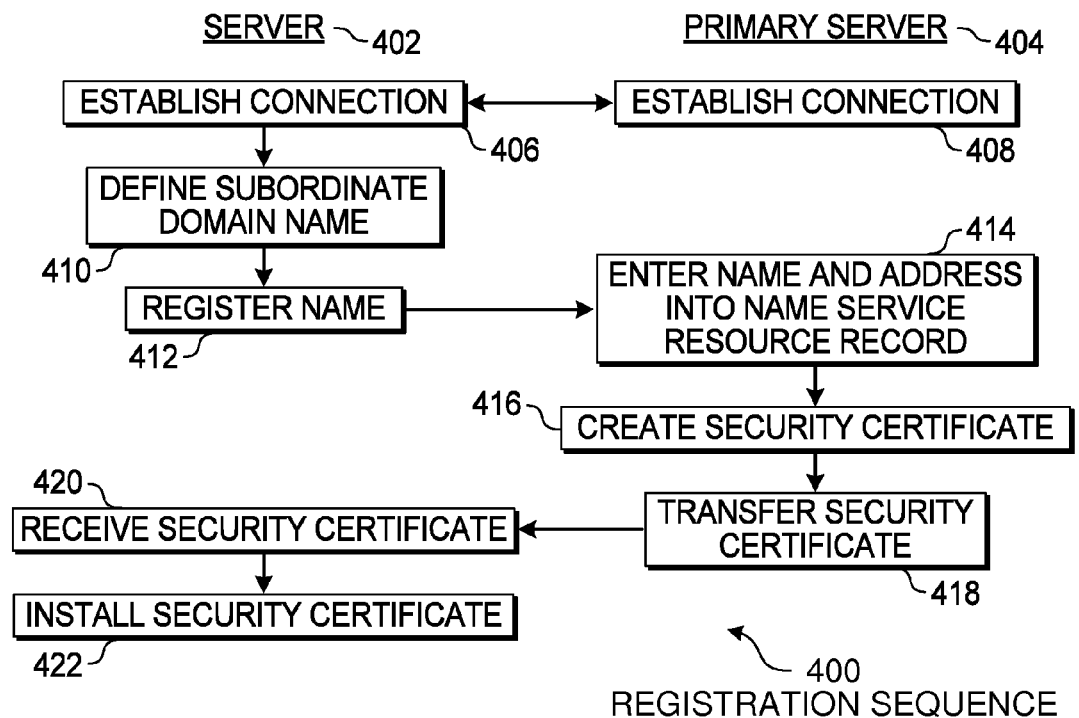
FIG. 4 is a timeline illustration of an embodiment showing a registration sequence.

FIG. 4 is a timeline illustration of an embodiment 400 showing a registration sequence. Embodiment 400 may illustrate the functions of a server 402 on the left and a primary server 404 on the right as a process similar to that of embodiment 200 is performed.

In blocks 406 and 408, a connection is established between server 402 and primary server 404.

A subordinate domain name may be selected in block 410 and registered in block 412 by the server 402. The registration of block 412 may comprise transmitting the selected domain name to the primary server 404, which may enter the domain name and network address into a name service resource record in block 414.

The primary server 404 may create a security certificate in block 416 and transfer the security certificate in block 418. The server 402 may receive the certificate in block 420 and install the certificate in block 422.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by a primary server, said method comprising:

establishing a first domain address;

establishing a first security certificate;

establishing a connection with a first server, said connection being made through a dynamically allocated network address;
receiving a subordinate domain name request from said first server, said subordinate domain name request being a request for a name that is a subdomain of said first domain address and compliant with a Domain Name System, said subordinate domain name request comprising a Domain Name System request;
registering said subordinate domain name in a nameserver resource record;
storing said dynamically allocated network address with said subordinate domain name;
issuing a subordinate security certificate for said first server, said subordinate security certificate being issued for said subordinate domain name and based on said first security certificate;
transferring said subordinate security certificate to said first server; and
forwarding a communication addressed to said subordinate domain name through said connection;
detecting that said subordinate security certificate has an expiration date;
obtaining an updated certificate; and
forwarding said updated certificate to said first server.

2. The method of claim 1, said dynamically allocated network address being an IP address.

3. The method of claim 1, said connection being one of a group of connections comprising:
a digital subscriber line connection; and
a cable modem connection.

4. The method of claim 1 further comprising:
receiving notification that that said dynamically allocated network address has changed to a new address; and
updating said dynamically allocated network address.

5. The method of claim 1 further comprising:
establishing a usage policy for said subordinate security certificate.

6. The method of claim 5 further comprising:
detecting compliance with said usage policy.

7. The method of claim 5 further comprising:
detecting noncompliance with said usage policy; and
invalidating said subordinate security certificate.

8. A computer readable storage medium which is not a signal comprising computer executable instructions configured to perform the method of claim 1.

9. A system being a primary server, said system comprising:
a first domain address;
a first security certificate;
a connection with a first server, said connection being made through a dynamically allocated network address;
a dynamic name server that:
receives a subordinate domain name request from said first server, said subordinate domain name request being a subdomain of said first domain address and compliant with a Domain Name System, said subordinate domain name request being a Domain Name System request;
registers said subordinate domain name with a domain name service server;
stores said dynamically allocated network address with said subordinate domain name; and
forwards a communication addressed to said subordinate domain name through said connection;
a security server that
issues a subordinate security certificate for said first server, said subordinate security certificate being issued for said subordinate domain name and based on said first security certificate;
transfers said subordinate security certificate to said first server;
detects that said subordinate security certificate has an expiration date;
obtains an updated certificate; and
forwards said updated certificate to said first server.

10. The system of claim 9, said dynamic name server that further
receives notification that that said dynamically allocated network address has changed to a new address; and
updates said dynamically allocated network address.

11. The system of claim 9, said security server that further:
establishes a usage policy for said subordinate security certificate.

12. The system of claim 11, said security server that further:
detects noncompliance with said usage policy; and
invalidates said subordinate security certificate.

13. A method comprising:
establishing a connection with a primary server, said connection being made through a dynamically allocated network address;
defining a subordinate domain name being compliant with a Domain Name System;
registering said subordinate domain name with said primary server, said primary server responds to a Domain Name System request for said subordinate domain, said primary server further creates a subordinate security certificate;
receiving a subordinate security certificate from said primary server, said subordinate security certificate being issued for said subordinate domain name;
installing said subordinate security certificate;
receiving a communication addressed to said subordinate domain name through said connection;
detecting that said subordinate security certificate has an expiration date; and
obtaining an updated certificate from said first server.

14. The method of claim 13, said dynamically allocated network address being an IP address.

15. The method of claim 13, said connection being one of a group of connections comprising:
a digital subscriber line connection; and
a cable modem connection.

16. The method of claim 13 further comprising:
detecting that said dynamically allocated network address has changed to a new address; and
notifying said primary server of said new address.

17. A computer readable storage medium which is not a signal comprising computer executable instructions configured to perform the method of claim 13.

* * * * *